United States Patent [19]

Sinclair et al.

[11] Patent Number: 5,597,784
[45] Date of Patent: Jan. 28, 1997

[54] COMPOSITE AND REINFORCED COATINGS ON PROPPANTS AND PARTICLES

[75] Inventors: A. Richard Sinclair; Richard L. Johnson, II, both of Houston, Tex.

[73] Assignee: Santrol, Inc., Houston, Tex.

[21] Appl. No.: 465,823

[22] Filed: Jun. 6, 1995

Related U.S. Application Data

[62] Division of Ser. No. 69,929, Jun. 1, 1993, Pat. No. 5,422,183.

[51] Int. Cl.$^6$ ..................................................... C09K 7/00
[52] U.S. Cl. ........................... 507/219; 507/269; 507/924; 166/280
[58] Field of Search .................................. 507/219, 269, 507/924; 166/280

[56] References Cited

U.S. PATENT DOCUMENTS

| | | | |
|---|---|---|---|
| Re. 34,371 | 9/1993 | Rumpf et al. | 501/128 |
| 3,393,736 | 7/1968 | Goodwin | 166/12 |
| 3,404,735 | 10/1968 | Young | 166/33 |
| 3,419,073 | 12/1968 | Brooks | 166/33 |
| 3,492,147 | 1/1970 | Young | 117/62.2 |
| 3,625,287 | 12/1971 | Young | 166/295 |
| 3,659,651 | 5/1972 | Graham | 507/219 |
| 3,929,191 | 9/1974 | Graham | 166/276 |
| 4,073,343 | 2/1978 | Harnsberger | 166/295 |
| 4,113,916 | 9/1978 | Craig | 428/404 |
| 4,413,931 | 11/1983 | McDonald | 405/264 |
| 4,439,489 | 3/1984 | Johnson | 428/404 |
| 4,443,347 | 4/1984 | Underdown | 252/8.55 R |
| 4,469,517 | 9/1984 | Cooke | 106/38.3 |
| 4,493,875 | 1/1985 | Beck et al. | 428/403 |
| 4,518,039 | 5/1985 | Graham | 166/276 |
| 4,522,731 | 6/1985 | Lunghofer | 252/8.55 R |
| 4,527,627 | 7/1985 | Graham | 166/280 |
| 4,552,815 | 11/1985 | Dreher et al. | 428/415 |
| 4,553,596 | 11/1985 | Graham | 166/295 |
| 4,555,493 | 11/1985 | Watson et al. | 501/127 |
| 4,564,459 | 1/1986 | Underdown | 252/8.55 R |
| 4,581,253 | 4/1986 | Evans | 427/221 |
| 4,585,064 | 4/1986 | Graham | 166/280 |
| 4,597,991 | 7/1986 | Graham | 427/214 |
| 4,658,899 | 4/1987 | Fitzgibbon | 166/280 |
| 4,680,230 | 7/1987 | Gibb et al. | 428/403 |
| 4,717,594 | 1/1988 | Graham | 427/214 |
| 4,732,920 | 3/1988 | Graham | 523/145 |
| 4,848,470 | 7/1989 | Korpics | 166/312 |
| 4,869,960 | 9/1989 | Gibb et al. | 428/405 |
| 4,879,181 | 11/1989 | Fitzgibbon | 428/402 |
| 4,888,204 | 12/1989 | Tutt | 427/53.1 |
| 4,894,285 | 1/1990 | Fitzgibbon | 428/402 |
| 4,921,820 | 5/1990 | Rumpf et al. | 501/128 |
| 4,921,821 | 5/1990 | Rumpf et al. | 501/128 |
| 4,929,648 | 5/1990 | Armbruster | 523/147 |
| 4,977,116 | 12/1990 | Rumpf et al. | 501/128 |
| 5,030,603 | 7/1991 | Rumpf et al. | 501/127 |
| 5,120,455 | 6/1992 | Lunghofer | 252/8.551 |
| 5,188,175 | 2/1993 | Sweet | 166/280 |
| 5,422,183 | 6/1995 | Sinclair et al. | 166/280 |

FOREIGN PATENT DOCUMENTS

| | | |
|---|---|---|
| 1217319 | 2/1987 | Canada . |
| 0116369A2 | 8/1984 | European Pat. Off. . |
| 0308257A2 | 3/1989 | European Pat. Off. . |

Primary Examiner—Philip Tucker
Attorney, Agent, or Firm—Arnold, White & Durkee

[57] ABSTRACT

A high strength particle comprised of a particulate substrate, a substantially cured inner resin coating, an outer resin coating, and a reinforcing agent interspersed at the inner coating/outer coating boundary, which is used in the propping of a fracture in a subterranean formation.

1 Claim, No Drawings

COMPOSITE AND REINFORCED COATINGS ON PROPPANTS AND PARTICLES

This application is a divisional of application Ser. No. 08/069,929, filed Jun. 1, 1993, now U.S. Pat. No. 5,422,183.

The present invention relates to resin coated particles, their use and a method for the manufacture. The improved particulate material of this invention has utility including, but not limited to, use as a proppant in hydraulic fracturing of subterranean formations.

BACKGROUND OF THE INVENTION

In the completion and operation of oil wells, gas wells, water wells, and similar boreholes, it frequently is desirable to alter the producing characteristics of the formation by treating the well. Many such treatments involve the use of particulate material. For example, in hydraulic fracturing, particles (propping agents or proppants) are used to maintain the fracture in a propped condition. In hydraulic fracturing, propping agent particles under high closure stress tend to fragment and disintegrate. At closure stresses above about 5000 psi, silica sand, the most common proppant, is not normally employed due to its propensity to disintegrate. The resulting fines from this disintegration migrate and plug the interstitial flow passages in the propped interval. These migratory fines drastically reduce the permeability of the propped fracture.

Other propping agents have been used to increase well productivity. Organic materials, such as the shells of walnuts, coconuts and pecans have been used with some success. These organic materials are deformed rather than crushed when a fracture closes under the overburden load. Aluminum propping agents are another type of propping agent that deforms rather than fails under loading. While propping agents such as these avoid the problem of creating fines, they suffer the infirmity of allowing the propped fracture to close as the proppant is squeezed flatter and flatter with time. In addition, as these particles are squeezed flat the spaces between the particles grow smaller. This combination of decreased fracture width and decreased space between the particles results in reduced flow capacities.

An improved proppant over the materials mentioned above is spherical pellets of high strength glass. These high strength glass proppants are vitreous, rigid and have a high compressive strength which allows them to withstand overburden pressures of moderate magnitude. In addition, their uniform spherical shape aids in placing the particles and providing maximum flow through the fracture. While these beads have a high strength when employed in monolayers, they are less satisfactory in multilayer packs. In brine at 250° F., the high strength glass beads have a tendency to disintegrate at stress levels between 5000 and 6000 psi with a resultant permeability which is no better, if not worse than sand under comparable conditions.

Resin coated particles have been used in efforts to improve the stability of proppants at high closure stresses. Sand or other substrates have been coated with an infusible resin such as an epoxy or phenolic resin. These materials are superior to sand at intermediate stress levels. However, at high temperature and high stress levels, the resin coated particles, still show decrease in permeability to about the same degree as silica sand.

U.S. Pat. No. 3,492,147 to Young et al. describes a process for producing particulate solid coated with an infusible resin. The particulates to be coated include sand, nut shells, glass beads and aluminum pellets. The resins used include urea-aldehyde resins, phenol-aldehyde resins, epoxy resins, furfuryl alcohol resins and polyester or alkyd resins. These particles are used as proppants in fracturing operations.

U.S. Pat. No. 4,443,347 also describes a method for propping fractures in subterranean formations using proppants comprised of sand particles with a precured phenol formaldehyde resin coating.

U.S. Pat. No. 3,929,191 to Graham et al. discloses a method for producing coated particles for use in treating subterranean formations. Particles in this method are coated with a resin dissolved in a solvent which is then evaporated. The patent also discloses the coating may be produced by mixing the particles with a melted resin and subsequently cooling the mixture, forming a coating of resin on the particles. The Graham patent also discloses that the addition of coupling agents to the system improves the strength of the resin-substrate bond.

Although resin coated sands have proven satisfactory in numerous applications, concern exists over their use under high closure stresses. For example, some self consolidating resin coated particles of the prior art do not develop their full strength until the resin coating has cured in the formation. In the event of rapid closure of the fracture, the proppant could be crushed before the resin cured, resulting in decreased permeability. The use of dual resin coated particles, such as described in U.S. Pat. No. 4,585,064, partially alleviates this problem.

As deeper wells with higher closure stress and harsher conditions are completed, even higher strength proppants are needed. That need is satisfied by the present invention which provides a dual resin coated particle having a reinforcing agent interspersed at the inner resin/outer resin boundary.

SUMMARY OF THE INVENTION

The present invention provides an improved resin coated particle comprising a particulate substrate, a substantially cured inner resin coating and an outer resin coating, with a reinforcing agent interspersed at the inner resin coating/outer resin coating boundary. The outer resin may be heat curable, fully cured, or of intermediate nature.

The invention also provides an improved method for treating subterranean formations comprising placing in the formation a quantity of free-flowing, dual coated reinforced particles. If particles with a curable outer coating are employed, the heat curable particles can be cured to form a coherent mass.

The present invention also provides an improved method for producing a free flowing dual resin coated particle. These improved resin coated particles are produced by first coating the substrate with a reactive resin, next dispersing a reinforcing agent at the surface of the first resin coating and then substantially curing that resin. A second or outer coating of a resin is then coated over the inner resin coating and reinforcing agent.

DESCRIPTION OF THE INVENTION

The present invention can be carried out with any suitable substrate. Choice of the particulate substrate is governed by the properties required by the particular application. One advantage of the invention is that conventional frac sand can be rendered superior to the more expensive manufactured proppants.

For example, in the oil and gas industry extremely high strength proppants are needed to hold open formation fractures created by hydraulic fracturing. In such an application, the present invention may use spherical glass beads as the particulate substrate. Such beads are available commercially in a variety of mesh sizes. For example, Union Carbide Corporation supplies vitreous, rigid, inert, substantially spherical pellets under the tradename UCAR props. Such beads, while of extremely high strength when employed in monolayers are less satisfactory when placed in multilayer packs. These beads when resin coated by the process of this invention and then cured in place yield a permeable mass of higher compressive strength than either the beads alone or resin coated beads of the prior art. Beads from about 6 to about 200 mesh are generally used. In extreme environments where stresses are very high, sintered bauxite, aluminum oxide, and ceramics such as zirconium oxide and other mineral particulates may be coated. Particles from 6 to 100 mesh are generally used. (All reference to mesh size of the claims and specification are to the U.S. standard sieve series).

Also suitable for use as substrates are various organic materials such as walnut and pecan shells, synthetic polymers such as nylon, polyethylene and other resin particles. Metallic particles such as steel and aluminum pellets can also be coated.

Conventional frac sand is the preferred particulate substrate of the invention. Silica sand of about 6 to 100 mesh (U.S. standard sieve) is generally used. One of the principal advantages of the instant invention is that frac sand coated by the method of this invention is as strong or stronger than the more expensive proppants described above. Just as importantly, in conditions where extreme stresses are expected the usable range of such high stress proppants as bauxite and the other ceramics can be extended by following the teachings of this invention.

Resins

Resins suitable for the inner and outer coatings are generally any resins capable of being coated on the substrate and then being cured to a higher degree of polymerization. Examples of such resins include phenol-aldehyde resins of both the resole and novolac type, urea-aldehyde resins, melamine-aldehyde resins, epoxy resins and furfuryl alcohol resins and copolymers of such resins. The resins must form a solid non-tacky coating at ambient temperatures. This is required so that the coated particles remain free flowing and so that they do not agglomerate under normal storage conditions. If desired, the resin of the outer coating can be fusible to allow cross linking of the resin coated particles during curing. Alternatively, the outer coating can be substantially cured such that little or no cross linking takes place upon exposure to downhole conditions. Outer resins of an intermediate character can also be prepared. Such outer resins, while not as reactive as the typical prior art self-consolidating proppants, still retain a degree of reactivity.

The preferred resins are the phenol-formaldehyde resins. These resins include true thermosetting phenolic resins of the resole type and phenolic novolac resins which may be rendered heat reactive by the addition of catalyst and formaldehyde. Such resins with softening points of 185° to 290° F. are acceptable.

The inner and outer coatings can be formed starting with the same or different resins. For example the inner coating could be produced from a resole and the outer coat from a novolac. However, for practical reasons the use of the same resin for both coatings is preferred.

Regardless of which type of resin is employed a coupling agent as subsequently described is preferably incorporated into the resin to be used as both the inner and outer coating during its manufacture. The coupling agent which has a functional group reactive in the resin system is added in an amount ranging from about 0.1 to 10% by weight of the resin. The preferred range is from about 0.1 to 3% by weight of the resin. When using the preferred phenol formaldehyde resins, the coupling agent is incorporated into the resin under the normal reaction conditions used for the formation of the phenol-formaldehyde resin. The coupling agent is added to the resin reactants prior to the beginning of the phenol formaldehyde condensation reaction.

The preferred resin to be used with the method of the present invention is a phenolic novolac resin. Particularly suitable is a phenolic novolac resin manufactured by Oxychem under the tradename DUREZ® 24-71S. This resin has a softening point of 207° to 216° F. When such a resin is used, it is necessary to add to the mixture a crosslinking agent to effect the subsequent curing of the resin. Hexamethylenetetramine is the preferred material for this function as it serves as both a catalyst and a source of formaldehyde.

Additives and process steps to minimize storage and handling problems have been described. For example, U.S. Pat. No. 4,732,920, to Graham and Sinclair, which is hereby incorporated by reference, describes the addition of calcium stearate to prevent sintering and mineral oil to prevent dust problems as well as other additives.

Coupling Agent

The coupling agent to be employed is chosen based on the resin to be used. For phenolic resins, the preferred coupling agents are organo functional silanes such as aminoalkyl silanes. Gamma-aminopropyl triethoxysilane has given excellent results when used in the amount of 0.5% with DUREZ® 24-715 resin.

Reinforcing Agent

A key to the increased strength of the resin coated particles of the present invention is the addition on a reinforcing agent in the boundary region between the inner and outer resin coatings. The reinforcing agents are added after coating the particle with the inner resin coating but before the inner coating is cured. Thus the reinforcing agent is dispersed on and in the uncured resin of the inner coat.

Following addition of the reinforcing agent, the inner resin coat is substantially cured. A second resin coating is then formed over the inner resin resulting in a high strength particle having the reinforcing agent interspersed the inner resin coating/outer resin coating boundary. As used herein, "inner resin coating/outer resin coating boundary" is meant to describe the placement of the reinforcing agent resulting from its addition to the uncured inner resin coating as described. The term is not meant to imply that any or all of the reinforcing agent penetrates both coatings. Rather the term is used as a convenient shorthand to describe the placement of the reinforcing agent in a manner that is believed to enhance the bonding Of the outer resin coating to the inner resin coating and increases the overall strength and durability of the particle.

Suitable reinforcing agents include the materials known to act as reinforcing agents in typical engineering resins and composite materials. Common to all suitable reinforcing agents is the requirement that they be of a particle size calculated to give the required properties. For example, various mineral fillers including fumed silica, silica flour, talc, clays, mica, asbestos, calcium carbonate, calcium sulfate, metals and wollastanite are suitable. The size of such reinforcing agents is typically less than 300 mesh. Reinforcing materials of a fibrous or rod like nature should be less than about 0.006" and preferably about 0.002" in length. Of these silica flour ground to about 325 mesh, is preferred.

Another type of reinforcing agent with utility in the present invention are impact modifiers used in engineering resins and composite materials. Examples of such materials include polyisobutylene, ethylene-vinyl acetate copolymers, ethylene-propylene copolymers and other rubbery materials. Also suitable are the so-called core shell impact modifiers having a rubbery core with a graft polymerized crystalline shell. To obtain the proper particle size cryogenic grinding of the rubbery materials is useful.

Coating Process Parameters

The inner and outer resin coatings may be formed by a variety of methods. For example, the solvent coating process described in U.S. Pat. No. 3,929,191, to Graham et al., hereby incorporated by reference, may be used. Other processes such as that described in U.S. Pat. No. 3,492,147 to Young et al. describes the coating of a particulate substrate with a liquid, uncatalyzed resin composition characterized by its ability to extract a catalyst or curing agent from a non-aqueous solution. As stated above, the preferred resins for use with the instant invention are phenol-formaldehyde novolac resins and when using such resins the preferred coating method is a hot melt coating procedure. Such a procedure is described in U.S. Pat. No. 4,585,064, to Graham et al. which is hereby incorporated by reference. The following is a discussion of typical coating process parameters using the preferred phenol-formaldehyde novolac resins and the preferred hot melt coating process.

The improved high strength particles of the invention are manufactured in a multi-step process. In the first step a phenol-formaldehyde resin inner coat is formed over the particulate substrate. Second, the reinforcing agent is added, followed by curing of the inner resin. In the fourth step an outer coating is formed. The outer coating may then be substantially cured or if desired cured to a lesser degree.

Formation of Inner Coating

The first or inner coating of resin is formed on the particulate substrate by first coating the heated substrate with a phenol-formaldehyde novolac resin. This coating is carried out by preheating the particulate substrate to a temperature above the melting point of the particular resin used and high enough to insure that when hexamethylenetetramine is added to the mixture that the resin is substantially cured. Substantially cured, as used herein, is to be interpreted as meaning that the cross linking reaction of the resin is substantially complete and that at typical downhole temperatures only minimal additional curing takes place.

Typically the particulate substrate is heated to 350° to 500° F. prior to resin addition.

The heated substrate is charged to a mixer or muller where generally from about 0.5% to about 5.0%, by weight of substrate, resin is added. The preferred amount of resin based on the weight of substrate is about 2%.

After completion of addition of the resin to the substrate, the substrate and melted resin are allowed to mix in the muller for a time sufficient to insure the formation of a uniform coating of resin on the sand, usually about 10 to about 30 seconds. After the substrate is uniformly coated with the inner resin, the reinforcing agent is added in an amount from about 0.05% to about 2% by weight of substrate. About 0.5% by weight of substrate is preferred. The substrate, resin and reinforcing agent are allowed to continue to mix to disperse the reinforcing agent, usually from about 5 to about 30 seconds.

Following this mixing step from about 5 to about 25%, by weight of the resin, of hexamethylenetetramine is added to the substrate resin mixture. The preferred amount of hexamethylenetetramine is about 13% of the resin weight. After addition of the hexamethylenetetramine the entire mixture is allowed to mull for approximately 1 minute. By the end of this time the resin coating on the substrate will be almost completely cured. The tumbling mass will be reduced to individual grains of dry resin coated substrate.

Formation of Outer Coating

After the resin coated sand in the muller has broken into individual grains and appears dry, the inner coating is completed. From about 0.5% to about 5% of phenol-formaldehyde novolac resin by weight of the substrate, is then added to the tumbling resin coated substrate. The preferred amount of resin added for the outer coating is about 2% of the weight of the substrate.

The resulting mixture is allowed to mix for an additional period of about 30 seconds to about 5 minutes. This time must be sufficient to insure complete coverage of the resin coated particles with the outer resin coating. Upon completion of mixing, powered hexamethylene tetramine is added to crosslink the outer resin coating. Generally the amount of hexamethylenetetramine added is from about 5 to about 25% based on the weight of the outer resin coating; the preferred amount is 13% An amount of water sufficient to cool the particles for handling is then added and the particles discharged from the muller.

If a curable outer coating is desired, the hexamethylenetetramine is added in water. The amount of water in which the hexamethylenetetramine is dissolved should be sufficient to cool the resin coated substrate mixture sufficiently to prevent the complete reaction of the hexamethylenetetramine with the novolac resin. The cooling effect of the water quench also serves to harden the resin coating. The amount of water needed ranges generally from about 1 to 5 gallons per thousand lbs of substrate. Generally, a 10% solution of hexamethylenetetramine is adequate to both disperse the hexamethylenetetramine and sufficiently quench the reaction.

Following addition of the hexamethylenetetramine water solution, the mixture is mulled for an additional 20 to 180 seconds. Again the tumbling mass of resin coated particulate substrate reduces to individual grains and appears dry. Following this additional mixing, the resin coated substrates is discharged from the muller for standard processing such as screening, dust removal, cooling and storage or bagging.

EXAMPLE

The following example is a description of a plant size experimental batch of reinforced high strength resin coated proppant. The procedure was as follows:

1. 1020 lbs of 20/35 mesh sand was charged to a heater and heated to 425°–450° F.
2. The heated sand was charged to the muller (mixer), requiring approximately 15 seconds.
3. 19 lbs of DUREZ® 24-715 resin, modified with 0.5% gamma-aminopropyl triethoxysilane, was added to the sand and the muller, requiring 5 seconds.
4. After 15 seconds, 5 lbs silica flour (325 mesh) was added.
5. After an additional 10 seconds, 2 lbs 8 oz dry hexamethylenetetramine was added to the resin coated sand.
6. After an additional 20 seconds of mulling, the resin coating on the sand was almost completely cured. The tumbling mass of sand was dry and had been reduced to individual grains.
7. 19 lbs of DUREZ® 24-715, modified as above resin was added to the tumbling sand mass (temperature equals 350°–400° F.). This addition required 20 seconds.

8. After an additional 80 seconds, 2 lbs 8 oz of hexamethylenetetramine was added.

9. After an additional 50 seconds of mulling, the tumbling mass of resin coated sand was quenched with 15 lbs of water. 10 seconds before discharge mineral oil (8 fl. oz.) was added as a dust control.

10. The resin coated sand was discharged to a screen conveyor.

FORMATION TREATMENT

The free-flowing, particles as produced by the above method may be used as proppants, gravel packs or fluid loss agents in hydraulic fracturing. In carrying out a hydraulic fracturing operating a fracture is first generated by injecting a viscous fluid into the formation at a sufficient rate and pressure to cause the formation to fail in tension. Injection of the fluid is typically continued until a fracture of the desired geometry is obtained. A carrier fluid having the proppant suspended therein is then pumped into the fracture. The temperature of the carrier fluid during pumping operations will be low so as to prevent premature curing (if curable) of the outer resin coat. The carrier fluid bleeds off into the formation and deposits the propping agent in the fracture. This process is controlled by fluid loss agents which are small aggregate particles which temporarily slow the fluid loss to the formation.

After the proppant is placed, the well is shut in with pressure maintained on the formation. As the pressure within the fracture approaches the normal formation pressure, the fracture walls close in on the proppant and apply an overburden stress thereto. If the outer coating is fusible, the strength imparted by the inner coating maintains the integrity of the proppant. At the same time ambient formation temperature heats the outer resin coating. Initially, the resin fuses and unites at contact areas between contiguous particles or with the formation walls. As the temperature increases the polymerization reaction proceeds until the resin is cured into an insoluble and infusible cross-linked state. The pendular regions between adjacent particles bond the packed particles into a permeable mass having considerable compressive strength.

The amount of such cross linking can be controlled during the manufacturing process. Proppants with outer resin coatings that are fusible and heat reactive can be prepared as can proppants with substantially cured infusible outer resins. It is preferred that the outer resin coating be cross linked sufficiently to be substantially inert to frac fluids so as to not adversely affect their properties. The application will determine the choice of a curable or cured outer coating. For example, a curable coating may be indicated for gravel packing, while in fracturing a substantially cured outer coating may be preferred to prevent interaction with the frac fluid.

A more detailed description of the standard industry practices for the use of resin coated particles in hydraulic fracturing and gravel pack completion is disclosed in U.S. Pat. No. 3,929,191 which is hereby incorporated by reference.

Further modifications and alternate embodiments of the invention will be apparent to those skilled in the art in view of this description. Accordingly, this description is to be considered as illustrative only and for the purpose of teaching those skilled in the art the manner of carrying out the invention. Various modifications may be made in the method. Applicants intend that all such modifications, alterations and variations which fall within the spirit and scope of the appended claims be embraced thereby.

What is claimed is:

1. A method of propping a fracture in a subterranean formation comprising:

creating a fracture in said subterranean formation;

placing in said fracture a quantity of high strength free flowing particles comprising:
a particulate substrate;
an inner coating of a substantially cured resin covering said substrate;
an outer coating of resin covering said inner coating; and
a reinforcing agent interspersed at the inner coating/outer coating boundary.

* * * * *